Dec. 11, 1951   J. P. O'NEIL   2,577,799
RECOVERY OF UNSATURATED OIL FROM USED HF CATALYST
Filed Dec. 31, 1948
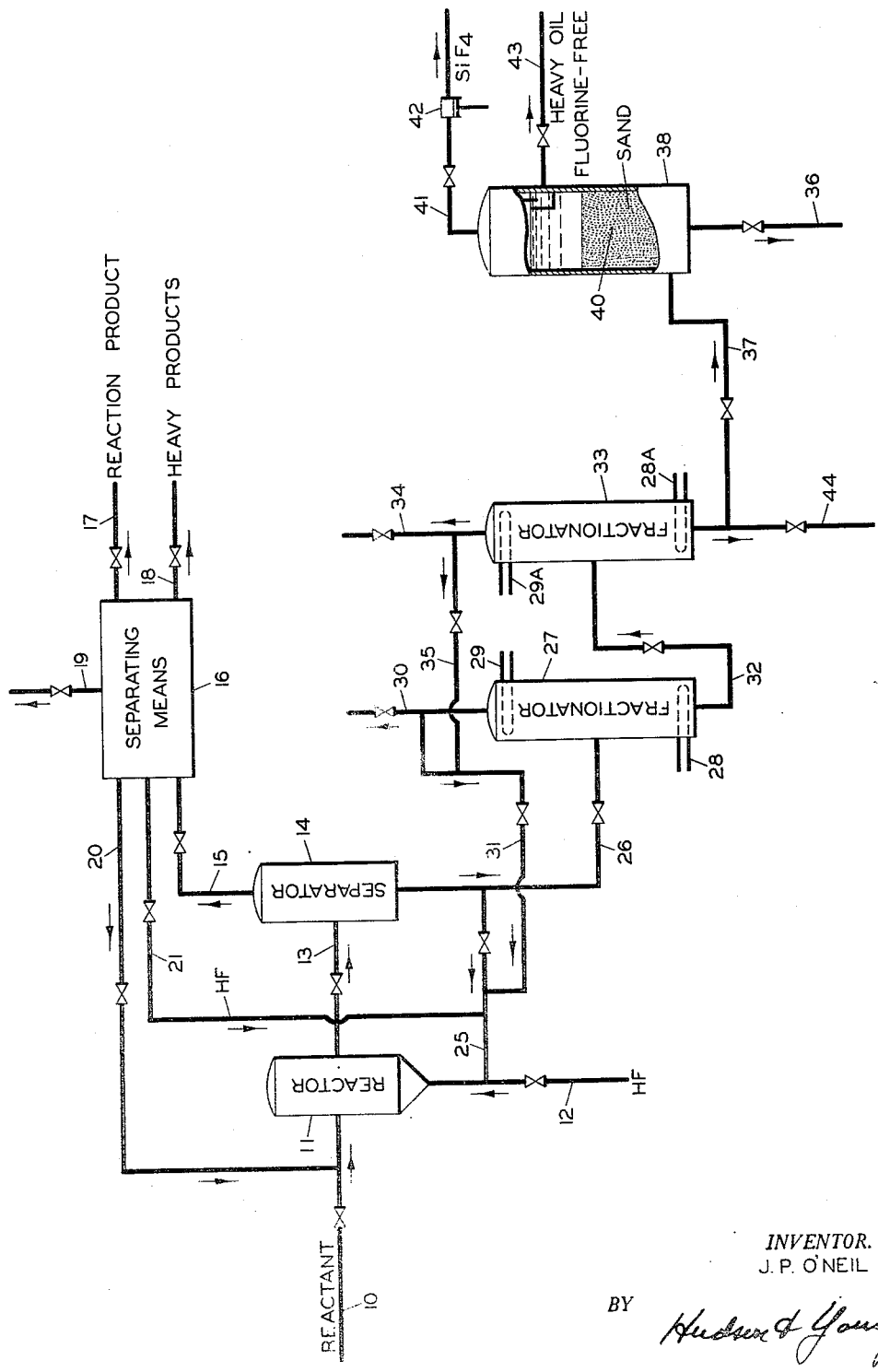
INVENTOR.
J. P. O'NEIL
BY
Hudson & Young
ATTORNEYS Patented Dec. 11, 1951

2,577,799

UNITED STATES PATENT OFFICE 2,577,799

RECOVERY OF UNSATURATED OIL FROM USED HF CATALYST

John P. O'Neil, Bay City, Tex., assignor to Phillips Petroleum Company, a corporation of Delaware Application December 31, 1948, Serial No. 68,474

1 Claim. (Cl. 260—666)

This invention relates to the production of a high-boiling unsaturated oil from contaminants which are present in a liquid hydrofluoric acid catalyst which has been used in the conversion of organic compounds.

Concentrated hydrofluoric acid, comprising essentially hydrogen fluoride, is commonly used as a catalyst for numerous reactions of organic compounds. Generally, such catalysts are used in the form of a liquid which, in its initial state, contains only hydrogen fluoride, except as commercially available materials always contain very small amounts of contaminants, such as water, sulfur dioxide, and the like. Such a catalyst is quite active in the conversion of various organic materials. Thus, it will effect reaction of paraffin hydrocarbons by alkylation, isomerization, disproportionation, and the like. In alkylation, the paraffin hydrocarbon reacts with an alkylating reactant such as an olefin, an alkyl halide, an alcohol, or other reactive alkyl compound. Similarly, an aromatic compound such as an aromatic hydrocarbon, or a phenol, or the like, may also be alkylated with the herein described catalyst. Such a catalytic material can also be used as a refining agent to remove sulfur compounds and other non-hydrocarbon organic impurities from liquid hydrocarbon materials, such as gasolines, kerosenes, lubricating oil fractions, and the like.

In all such uses, the hydrogen fluoride catalyst tends to become contaminated with "catalyst soluble" carbonaceous materials formed by undesired side reactions, the accumulation of which in the composition results in gradual deactivation. Usually it is advantageous to renew and/or to regenerate the catalyst before the total accumulated catalyst-soluble material reaches about 30 per cent by weight of the catalyst. If the proportion of catalyst-soluble materials becomes higher than this, the catalyst becomes inefficient and the rate of formation of additional catalyst-soluble materials becomes excessively high.

In the regeneration of such a used hydrofluoric acid catalyst, it is frequently customary to subject at least a portion of it to a treatment comprising removal of free hydrogen fluoride from higher-boiling impurities by distillation and recovery of hydrogen fluoride from organic fluorine materials present in such high-boiling impurities. This later part of the treatment includes heating an organic residue to decompose such compounds, forming additional free hydrogen fluoride. However, the resulting high-boiling residue frequently still contains an appreciable amount of fluorine compounds, in part possibly some free hydrogen fluoride and in part organic fluorine compounds. Although the total amount of residual fluorine is usually less than one per cent of this residual oil, and often is in the range of 0.1 to 0.001 per cent, by weight of such oil, even this small amount is frequently undesirably large, as when this oil is to be used commercially.

I have now found that such a small residual amount of fluorine in the heavy organic oil recovered from such a used hydrofluoric acid catalyst can be easily and successfully removed by contacting the oil, while it is liquid and preferably at the temperature at which it is available from the catalyst regeneration treatment just discussed, to the action of a bed of sand, or other siliceous material, under a subatmospheric pressure. In this latter treatment the fluorine, whether it be in the form of hydrogen fluoride or of more resistant organic fluorine compounds, reacts with silicon compounds to form silicon tetrafluoride which is immediately removed from the reaction zone as a gas, and a fluorine-free unsaturated liquid oil is separately removed from the reaction zone as a final product. While my invention is usually practiced in connection with the use of hydrofluoric acid alone as a catalyst, it may also be used to advantage when a small amount, such as 0.1 to 10 per cent by weight, of a promoter, such as boron trifluoride, is included in the hydrofluoric acid catalyst.

An object of my invention is to produce a fluorine-free oil from a hydrofluoric acid catalyst used in organic reactions.

A further object of my invention is to recover a valuable, highly unsaturated hydrocarbon oil as a by-product from a process for treating a hydrocarbon material with concentrated hydrofluoric acid.

Further objects and advantages of my invention will become apparent, to one skilled in the art, from the accompanying disclosure and discussion.

My invention can be more clearly discussed, and various modifications of it disclosed, by a discussion of the accompanying drawing. This drawing is a schematic flow diagram of one arrangement of apparatus suitable for practicing my invention.

Referring now to the drawing, an organic reactant is introduced through line 10 into reactor 11, wherein it is intimately mixed with a catalyst comprising concentrated hydrofluoric acid introduced through line 12. Such an organic reactant may comprise a single material such as normal butane, or a polyalkyl aromatic hydrocarbon when it is desired to isomerize such a material, or it may comprise a mixture of reactants, such as an alkylatable organic compound to be alkylated and an alkylating reactant, such as previously discussed, or it may comprise a mixture of paraffin hydrocarbons to be subjected to disproportionation, or the like.

After a suitable reaction time, the mixture from reactor 11 is passed through line 13 to separator 14 wherein it is separated into two liquid phases, as by cooling, and/or gravitational or centrifugal means. The phase rich in reactants and reaction products is generally the lighter phase and is passed through line 15 to separating means 16, which may comprise any necessary number of individual fractionating columns, and required auxiliary equipment, wherein organic effluents of reactor 11 are separated into several desired products, by-products and recycled fractions. For example, low-boiling materials may be discharged through line 19. Unreacted reactants can be recycled through line 20 to reactor 11. A low-boiling product of the reaction can be recovered through line 17. High boiling products of the reaction can be recovered through line 18. Any hydrogen fluoride which is present in the material passed through line 15 to separating means 16 is recovered, and may be recycled to reactor 11 through lines 21 and 25.

The heavier or catalyst phase from separator 14 is in part recycled to reactor 11 through line 25 and in part is passed for regeneration through line 26 to suitable regeneration means, illustrated by fractionators 27 and 33, which are equipped with suitable heating means 28 and 28A, respectively, and suitable cooling means 29 and 29A, respectively. In fractionator 27 the used hydrofluoric acid catalyst is distilled at a relatively low temperature, such as a kettle temperature between 100 and 150° F., to remove the large amount of free hydrogen fluoride present in the used catalyst. Resulting free hydrogen fluoride is removed as a low-boiling fraction through line 30, and may be recycled to reactor 11 through lines 31 and 25 or, if desired, may in part be discharged from the system. A high-boiling fraction comprising organic contaminants, together with a small amount of water, is removed through line 32 and passed to fractionator 33 where it is subjected to distillation at a higher temperature, not only to remove water, but also to decompose organic fluorine compounds to form an unsaturated high-boiling oil and free hydrogen fluoride. Free hydrogen fluoride and water is removed as a low-boiling product through line 34 and may be recycled, at least in part, to reactor 11 through lines 35, 31 and 25. Fractionator 33 is usually operated at a slight superatmospheric pressure, such as up to about 20 pounds per sq. inch guage, with a kettle temperature sufficiently high to decompose most of the organic fluorine compounds present in the material charged through line 32, such as between 200 and 350° F. The kettle product, which is usually a highly unsaturated organic oil with a fluorine content less than about 1 per cent by weight, and frequently between about 0.1 and 0.001 per cent by weight, is passed directly from the kettle of fractionator 33 through line 37 to the lower part of a bed 40 of granular siliceous material, such as sand, in a reaction zone 38. It is unnecessary to heat this material above the temperature at which it is available when it comes from the kettle of fractionator 33, so that it is introduced into reaction zone 38 at a temperature of at least 200° F., and not higher than the kettle temperature in fractionator 33. While it is preferred that the siliceous material 40 in reaction zone 38 be a bed of granular silica, such as coarse sand or quartz, it may be some highly siliceous granular material such as a siliceous clay. Reaction zone 38 is so constructed that there is a liquid product withdrawal line 43 at a point above the top of bed 40, but below a liquid level which is maintained within reaction zone 38 by suitable means such as a weir. Above the liquid level is a vapor space and gaseous products are promptly withdrawn from the vapor space through line 41 by vacuum pump 42. This vacuum pump maintains an absolute pressure which is subatmospheric, and preferably between 10 and 500 mm. of mercury pressure absolute, in reaction zone 38. By these means silicon tetrafluoride is immediately removed as a gas as soon as it is formed by reaction of the siliceous material 40 with the fluorine compounds present in the hot residual liquid passed from the kettle of fractionator 38 through line 37, and a fluorine-free unsaturated heavy oil is separately removed through line 43. In order to accomplish this and produce a satisfactory fluorine-free oil, such as one having a fluorine content below 0.0001 per cent by weight, I prefer to use a flow rate of oil through line 37 between 1 and 5 liquid volumes per volume of siliceous material 40 per hour. When it is necessary to drain reaction zone 38, this may be accomplished by removing material through line 36. In the event it is necessary to remove material directly from the kettle of fractionator 33, this may be accomplished through line 44. The unsaturated organic oil recovered as a product through line 43 is essentially a hydrocarbon oil when the reactants charged to reactor 11 are hydrocarbons, alcohols, or hydrocarbon fluorides. It usually has an initial boiling point of about 200–250° F., a bromine number between 20 and 100, a dark red or brownish color, a fluorine content less than 0.0001 per cent by weight, and a specific gravity greater than 0.85.

It will be readily appreciated by one skilled in the art that the drawing is schematic only and that numerous pieces of additional equipment, such as contactors, means for removing the heat from such contactors, fractional distillation columns and associated equipment for separating means, and various pumps, flow control valves, heating and cooling means, and the like, have not been shown in detail. However, a sufficient amount of the essential equipment and a discussion of the general flow, material compositions, and operating conditions have been given herein to act as a complete guide to one skilled in the art to enable him to adapt the invention and install equipment for any specific modification thereof.

As will be evident to those skilled in the art, various modifications of this invention can be made, or followed, in the light of the foregoing disclosure and discussion, without departing from the spirit or scope of the disclosure or from the scope of the claim.

I claim:

An improved process for producing a heavy, unsaturated oil from effluents of a process for reacting hydrocarbons in the presence of a liquid hydrofluoric acid catalyst, which comprises separating from effluents of such a process a liquid hydrofluoric acid phase, subjecting at least a portion of said hydrofluoric acid phase to distillation to remove free hydrogen fluoride from residual organic contaminants, subjecting said residual organic material to a decomposition temperature to effect decomposition of a major portion of organic fluorine compounds to form free hydrogen fluoride and an unsaturated liquid oil contaminated with a minor amount of more resistant organic fluorine compounds, separating said contaminated liquid oil containing fluorine as an impurity in an amount between 1 and 0.001 per cent by weight from freed hydrogen fluoride at said decomposition temperature and passing said oil as a liquid up through a bed of granular silica at a temperature between 200° and 350° F. under an absolute pressure between 10 and 500 mm. of mercury at a flow rate between 1 and 5 volumes of said oil per volume of said granular silica per hour, withdrawing resulting silicon tetrafluoride vapors from the top of said bed, and separately withdrawing a purified liquid oil from the top of said bed.

JOHN P. O'NEIL.

REFERENCES CITED

The following references are of record in the file of this patent:

UNITED STATES PATENTS

| Number | Name | Date |
|---|---|---|
| 2,377,546 | Frey | June 5, 1945 |
| 2,388,918 | Iverson | Nov. 13, 1945 |
| 2,436,695 | Kuhn | Feb. 24, 1948 |
| 2,463,930 | Wildman | Mar. 8, 1949 |